F. SUDDOTH.
RULER.
APPLICATION FILED FEB. 1, 1911.
1,018,790.
Patented Feb. 27, 1912.
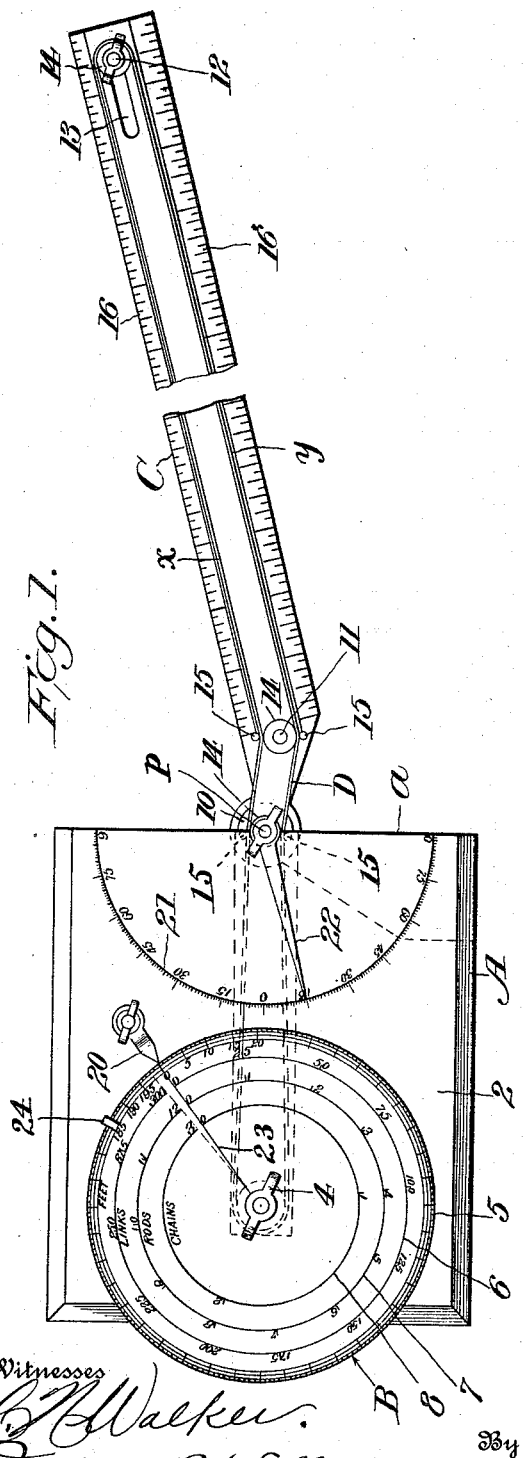
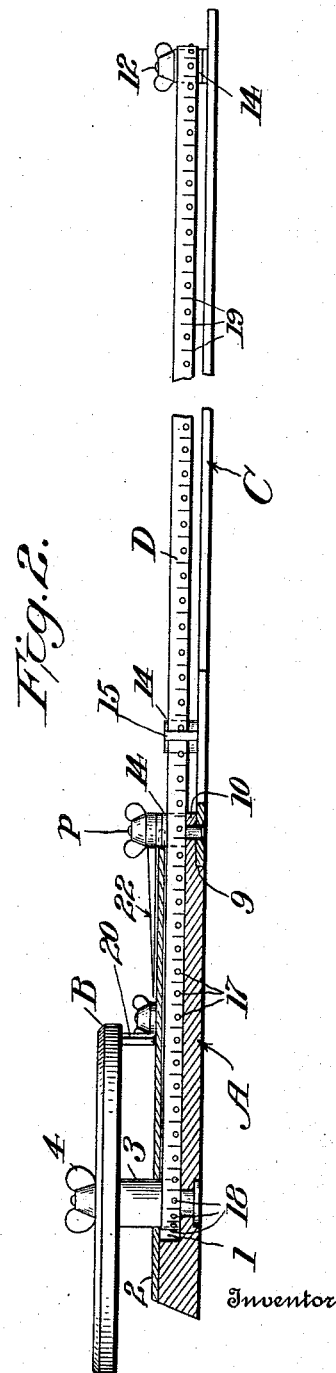

UNITED STATES PATENT OFFICE.

FRANK SUDDOTH, OF MOUNT VERNON, INDIANA.

RULER.

1,018,790.  Specification of Letters Patent.  Patented Feb. 27, 1912.

Application filed February 1, 1911. Serial No. 606,039.

*To all whom it may concern:*

Be it known that I, FRANK SUDDOTH, a citizen of the United States, residing at Mount Vernon, in the county of Posey and State of Indiana, have invented certain new and useful Improvements in Rulers, of which the following is a specification.

The purpose of my invention is to provide a ruler, with means thereon for enabling the operator to lay off drawings or take readings from drawings on any desired scale, and also to convert readings in one system of linear measurements to readings in another system of linear measurements on any desired scale, without resort to mental calculations.

The details of the invention and the operation and advantages of the same will be clear from the following specification taken in connection with the accompanying drawing, in which,—

Figure 1 is a plan view of the device, partly broken away; and Fig. 2 is a side view of the same, the base being shown in section on a line passing longitudinally through the groove in the base.

Referring to the drawing, A indicates a flat rectangular base, having a groove 1 extending partly through it and having a top piece 2 which extends over the base and covers the groove. At the inner end of the groove is journaled a spindle 3 the circumferential measurement of which is one inch. Upon the upper end of said spindle is detachably secured, by means of a suitable nut 4, a dial plate B, which, as shown in the drawing, has four scales thereon, the peripheral scale 5, being in feet, while the scales 6, 7 and 8 are in chain measure, or links, rods and chains, respectively. A stud *p* is arranged centrally of the groove 1 with its axis in line with the edge *a* of the base, and a ruler C is pivoted on the lower end of said stud, the lower side of the base being rabbeted, as shown at 9, to permit the ruler to lie flush with the bottom of the base. The base has a slight projection beyond the edge *a*, as shown at 10, so that the axis of the stud *p* may be supported in line with the edge *a*. The ruler C is also provided, near its ends, with studs 11 and 12, the latter being adjustable, to some extent, in a slot 13 in the ruler. Rollers 14 surround the studs *p*, 11 and 12, and at opposite sides of the rollers on the studs *p* and 11 are arranged guide pins 15. The ruler C is provided with scales 16, in feet and fractions thereof, on its opposite edges.

A flexible, endless band, or tape, D, preferably of steel, but which may be of any other suitable material, extends around the spindle 3 and the studs *p*, 11 and 12, fitting between the guide pins 15 and the rollers upon the studs *p* and 11. The stud 12 forms a guide for the band at the free end of the ruler. This band has a series of perforations, 17, and the spindle 3 has a series of teeth, or projections, 18, which are adapted to engage the perforations in the band. The band is also provided with indicating marks, 19, at suitable intervals apart. A pointer 20 is secured to the base and extends close to the periphery of the disk B.

The scales, shown on the dial in the drawing, are merely illustrative. It is the purpose to provide a series of such dials, with scales of different proportions, and different measures, and when it is desired to work on a given scale, the appropriate dial will be placed upon the spindle 3. As the spindle 3 is one inch in circumference, a movement of the band along the ruler the distance of one inch, will rotate the dial once, and if, as in the drawing, the peripheral scale 5 has two hundred divisions, the movement of the band will be indicated by the dial and pointer on a scale of two hundred feet to the inch. With a dial having three hundred divisions on its periphery, the movement of the band would be indicated, on the dial, on a scale of three hundred feet to the inch. The measurements in links, rods and chains would be indicated on the same scale by the dial. As the distance of two hundred feet, indicated by the scale 5 on the dial illustrated in the drawing, cannot be indicated in whole numbers in links, rods or chains, the nearest measurements in whole numbers,—three hundred links on the scale 6, twelve rods on the scale 7 and three chains on the scale 8, each equivalent to one hundred and ninety-eight feet,—are indicated by the divisional marks on the dial.

An arcuate scale 21 is arranged upon the cover of the base A and a pointer 22 secured to the stud *p* indicates the angle of the ruler with reference to the edge *a* of the base.

The dial is adjusted upon the spindle so that when its zero line 23 is opposite the pointer 20, the indicating marks 19, upon the band, will register with divisional marks upon the ruler. Thus, if the marks 19 are a quarter of an inch apart they will register with the quarter inch marks on the ruler scales.

In using the instrument, if we assume that the operator has a plat and description reading partly in feet and partly in chain measure, and he wishes to make a drawing from these on a scale of 200 feet to the inch, he places upon the stud 3 a dial having 200 divisional marks on its periphery. Then, if the first reading is 185 feet, he places the ruler upon the drawing with one of the indicating marks on the band D opposite the starting point, and moves the band until the dial moves a distance corresponding to 185 feet on its outer scale 5, and the distance which said indicating mark on the band moves, which is to be noted on the drawing, will correspond to a distance of 185 feet on a scale of 200 feet to the inch. If the next reading is in chain measure, say nine rods, the zero line on the dial is again brought opposite the pointer, and the ruler is placed with one of the indicating marks on the band opposite the starting point for this measurement. The band is then moved until the dial turns a distance corresponding to nine rods on the scale 7, and the distance which the divisional mark on the band moves, which is to be noted on the drawing, will indicate nine rods on a scale of 200 feet to the inch. In the same way readings in chains and links may be noted on the drawing on a scale of 200 feet to the inch.

If desired, a detachable clip 24 may be set on the edge of the dial, adjacent to the numeral indicating the measurement which is to be transcribed, and when the dial turns the predetermined distance it will be stopped by the engagement of the clip with the pointer 20. The band may be moved by turning the dial or by pulling upon the band.

If the distance to be transcribed on a scale of 200 feet to the inch is more than 200 feet in long measure, the removable clip will not be used, as the dial would have to be turned more than one revolution to indicate the greater distance.

If the description reads in chain measure, and is more than three chains, (or 12 rods, or 300 links), and is to be plotted on a scale of 200 feet to the inch, the dial may be turned in one direction to indicate three chains, and then reversed to indicate the distances above three chains. Thus, if the distance to be plotted on the scale mentioned is five chains, the dial will be turned to bring its zero line opposite the pointer, and one side of the band, the side $y$, for instance, will be moved to the right in Fig. 1, until a distance of three chains is indicated by the dial. This distance is to be indicated upon the drawing at the edge of the ruler adjacent to the side $y$ of the band. The side $x$ of the band is then moved in the same direction, (to the right in Fig. 1), until the dial turns backward a distance indicating two chains, and the distance which the side $x$ of the band moves, added to the distance which the side $y$ moves in the same direction, will be equivalent to five chains, on a scale of 200 feet to the inch. In using a dial for this scale, the removable clip may be attached to the dial at the 198 foot mark to stop the dial after it has turned that distance, which is equivalent to three chains 12 rods or 300 links, at which point the dial must be reversed to indicate greater distances in chain measure. For distances greater than 6 chains, it will be understood that the 200-feet-to-the-inch dial would have to be reversed two or more times and the distances noted on the opposite sides of the ruler, alternately.

If the operator has a drawing made on a scale of 200 feet to the inch and wishes to take readings in feet or chain measure, it is only necessary to place the 200 feet dial on the device, move the band so as to carry one of its indicating marks from one point to the other on the drawing, and note the distance in feet or chain measure on the dial.

It will be understood from the foregoing that if drawings are to be plotted or transcribed on scales of other proportions, such as 100, 300, 400 feet to the inch, etc., the proper dial will be placed upon the spindle 3 and the device will be used in the manner indicated above. It will also be understood that the ruler can be adjusted to any desired angle with respect to the base by means of a scale 21 and pointer 22.

What I claim is:—

1. The combination with a ruler, of a spindle suitably supported adjacent to one end of the ruler, a guide on the opposite end of the ruler, an endless band extending around said spindle and said guide, and a dial upon the spindle, said dial having scale-markings thereon for indicating distances, on the same scale, by different systems of linear measurement.

2. The combination with a base and a ruler projecting therefrom, of a spindle upon the base, a guide upon the free end of the ruler, an endless band extending around said spindle and guide, and a dial upon the spindle, said dial having scale-markings thereon for indicating distances, on the same scale, by different systems of linear measurement.

3. The combination with a base and a ruler projecting therefrom, of a spindle upon the base, a guide upon the free end of the ruler, an endless band extending around said spindle and guide, said band having indicating marks thereon, and a dial upon the spindle, said dial having scale-markings thereon for indicating distances, on the same scale, by different systems of measurement.

4. The combination with a base and a ruler projecting therefrom, of a spindle upon the base, a guide upon the free end of the ruler, an endless band extending around said spindle and guide, a dial having scale-markings thereon for indicating distances, on the same scale, by different systems of linear measurement, and means for detachably securing said dial to the spindle.

5. The combination with a base, of a ruler pivoted to the base, a spindle upon the base and a guide at the free end of the ruler, an endless band extending around said spindle and guide and a dial upon the spindle, said dial having scale-markings thereon for indicating distances, on the same scale, by different systems of linear measurement.

6. The combination with a ruler and a guide upon one end of the ruler, of a spindle, having a circumference of one inch, suitably supported adjacent to the opposite end of the ruler, an endless band extending around said spindle and guide, said band having indicating marks thereon, and a dial upon said spindle, said dial having scale-markings for indicating distances in feet, and scale-markings for indicating distances in chain measure, the markings for both systems of measurement being upon the same scale.

7. The combination with a base having a groove therein, and a cover fitting over said groove, of a spindle mounted upon the base at one end of the groove, a ruler pivoted to the base at the other end of the groove, an endless band extending around said spindle, through the groove and along the ruler, and a dial mounted on the spindle.

8. The combination of a ruler, a dial rotatably mounted adjacent one end of the ruler, an indicating device adjustable endwise of the ruler toward and from the dial, and connections between said dial and device adapted to rotate the dial in proportion to the movement of said device, said dial having scale markings for indicating distances on a reduced scale proportional to the movements of said device.

9. The combination of a ruler, a dial rotatably mounted adjacent one end of the ruler, an indicating device adjustable lengthwise of the ruler toward and from the dial, and connections between said dial and device adapted to rotate the dial in proportion to the movement of said device, said dial having scale markings for indicating distances by several different systems of linear measurements on the same scale and in proportion to the movements of said device.

In testimony whereof I affix my signature, in presence of two witnesses.

FRANK SUDDOTH.

Witnesses:
 ISAAC WOLF,
 GEORGE WM. CURTIS.

Copies of this patent may be obtained for five cents each, by addressing the "Commissioner of Patents, Washington, D. C."